J. G. S. Garwood. Combined Harrow, Planter and Cultivator.

No. 73593

PATENTED JAN 21 1868

Witnesses
Theo Tusche
J. A. Fraser

Inventor:
J. G. S. Garwood
Per Munn &
Attorneys

United States Patent Office.

J. G. S. GARWOOD, OF VERMILLION, ILLINOIS.

Letters Patent No. 73,593, dated January 21, 1868.

---

IMPROVEMENT IN HARROW, CULTIVATOR, AND PLANTER, COMBINED.

---

The Schedule referred to in these Letters Patent and making part of the same.

---

TO ALL WHOM IT MAY CONCERN:

Be it known that I, J. G. S. GARWOOD, of Vermillion, in the county of Edgar, and State of Illinois, have invented a new and improved Combined Harrow, Planter, and Cultivator; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
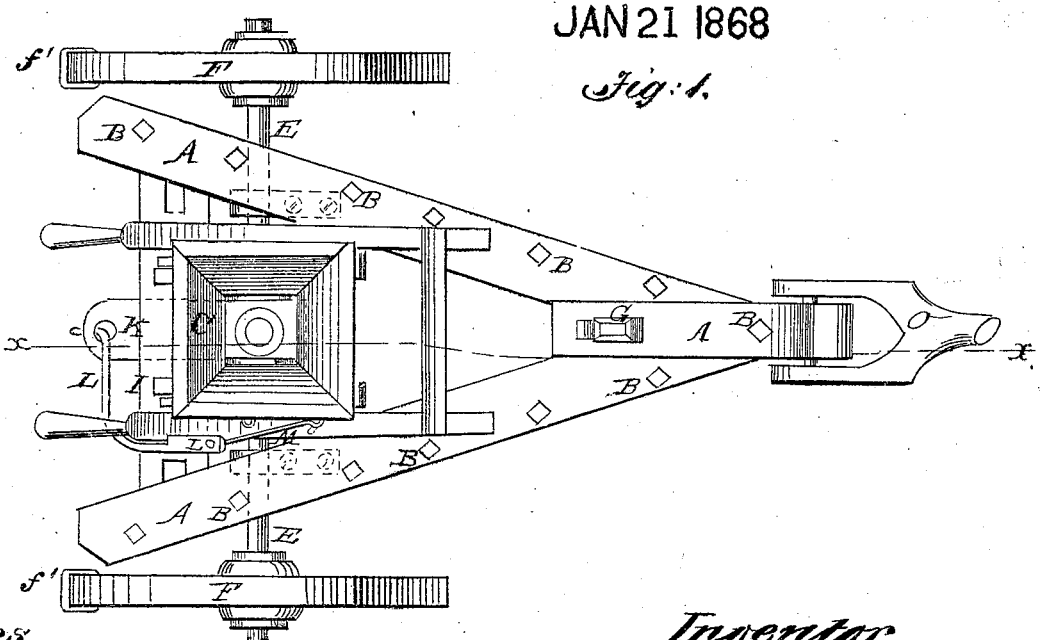
Figure 1 is a top or plan view of my improved machine.
Figure 2:
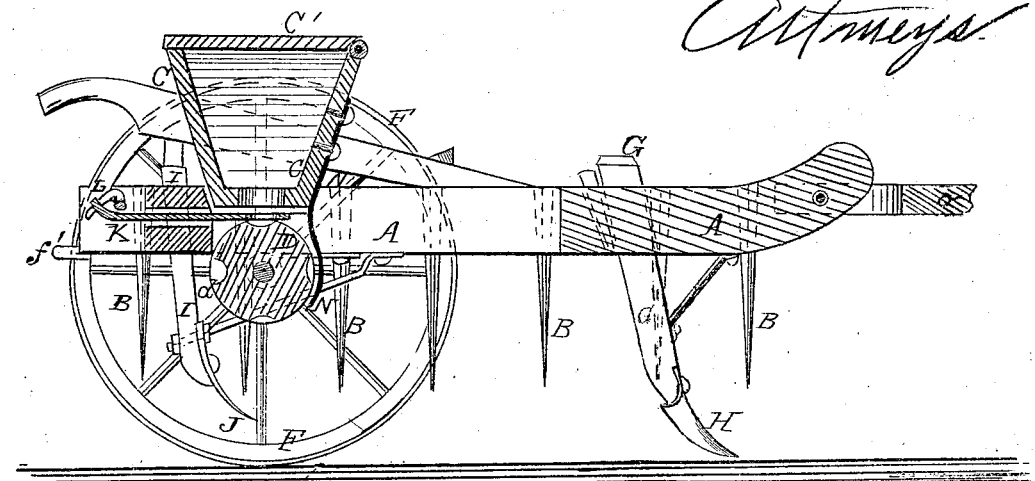
Figure 2 is a vertical longitudinal section of the same, taken through the line $x\ x$, fig. 1.

My invention has for its object to furnish a simple and convenient machine, which shall be so constructed and arranged as to be easily adjusted for use as a harrow to prepare the ground, as a planter to drop and cover the seed, and as a cultivator to cultivate the crop; and it consists in the combination and arrangement of the various parts, as hereinafter more fully described.

A is the frame of an ordinary v-shaped harrow, having teeth B attached to it in the usual manner. C is a seed-box, attached to the upper side of the rear part of the frame A, and which is provided with a cover, $c'$, which also serves as a seat for the driver. The bottom of the seed-box C is perforated to allow the seed to pass through to the dropping-cylinder D, which is rigidly attached to the axle E. The dropping-cylinder has a recess or cavity, $d'$, formed in one side, of such a size as to hold the desired amount of grain for one hill. If it is desired to use the machine as a drill, more and smaller recesses must be formed in the said cylinder D. The axle E revolves in removable bearings attached to the lower side of the frame A, and has wheels F rigidly attached to its ends, which, by their revolution, revolve the axle E and dropping-cylinder D. To the rim of one or both the wheels F, directly opposite the recess $d'$ of the dropping-cylinder D, is attached a clasp or marker, $f'$, which marks the ground directly opposite each hill, so that the planting may be done in accurate check-row, if desired. To the forward central part of the frame A is adjustably and removably attached the standard G of the plough H, which opens the furrow into which the seed is dropped by the cylinder D. To the rear part of the frame A, in the rear of each end of the dropping-cylinder D, in such positions as to cover the seed dropped by said cylinder, are removably and adjustably attached the standards I of the covering-ploughs J. K is a slide, working in a groove in or upon one side of the bottom board of the seed-box C, and which has a hole through it, through which the seed passes to the cylinder D. When the slide K is pushed forward, the hole through the bottom of the seed-box is closed, and the escape of the seed prevented. The slide is operated by the hand-lever L, pivoted to the framework of the machine, and the upper end of which extends upward into such a position as to be easily reached and operated by the driver from his seat. The lever L is secured in place, holding the slide K stationary in either position, by a hook, M, pivoted to its upper part, and hooking into one or the other of the eyes or staples attached to the end of the seed-box C. N is a curved spring-plate or apron, the upper end of which is secured to the forward side of the seed-box C, and which extends around the forward side of the dropping-cylinder D, to prevent the seed from escaping from the recess $d'$ before the cylinder D has revolved to the proper position. O is a tongue, attached to the forward end of the frame A, and which need not be used when the machine is used simply as a harrow.

By removing the plough-standards and the seed-dropping device, the machine becomes simply a harrow; and by removing the forward plough-standard, either with or without removing the seed-dropping device, the machine may be used as a cultivator.

Having thus described my invention, what I claim as new, and desire to secure by Letters Patent, is—

1. The combination, in one machine, of the harrow A B, plough-standards G I, ploughs H J, seed-box C, dropping-cylinder D, axle E, and wheels F, substantially as herein shown and described, and for the purpose set forth.

2. In combination with the above, I claim the curved spring-plate or apron N, seed-box C, and dropping-cylinder D, substantially as herein shown and described, and for the purpose specified.

3. The combination of the slide K, lever L, and hook M, with each other, and with the seed-box C and dropping-cylinder D, substantially as herein shown and described, and for the purpose set forth.

J. G. S. GARWOOD.

Witnesses:
JAS. VANKIRK,
MICHAEL WHITEHEAD.